US011925209B2

(12) United States Patent
Lee et al.

(10) Patent No.: US 11,925,209 B2
(45) Date of Patent: Mar. 12, 2024

(54) CARTRIDGE FOR AEROSOL GENERATING DEVICE AND METHOD FOR MANUFACTURING THE SAME

(71) Applicant: KT&G CORPORATION, Daejeon (KR)

(72) Inventors: Jong Sub Lee, Seongnam-si (KR); Kyung Moon Ji, Anyang-si (KR)

(73) Assignee: KT&G CORPORATION, Daejeon (KR)

( * ) Notice: Subject to any disclaimer, the term of this patent is extended or adjusted under 35 U.S.C. 154(b) by 751 days.

(21) Appl. No.: 16/969,803

(22) PCT Filed: Apr. 28, 2020

(86) PCT No.: PCT/KR2020/005568
§ 371 (c)(1),
(2) Date: Aug. 13, 2020

(87) PCT Pub. No.: WO2020/222495
PCT Pub. Date: Nov. 5, 2020

(65) Prior Publication Data
US 2023/0107756 A1 Apr. 6, 2023

(30) Foreign Application Priority Data
Apr. 30, 2019 (KR) ........................ 10-2019-0050985

(51) Int. Cl.
*A24F 40/46* (2020.01)
*A24F 40/10* (2020.01)
(Continued)

(52) U.S. Cl.
CPC .............. *A24F 40/46* (2020.01); *A24F 40/10* (2020.01); *A24F 40/42* (2020.01); *A24F 40/44* (2020.01);
(Continued)

(58) Field of Classification Search
CPC .......... A24F 40/46; A24F 40/10; A24F 40/42; A24F 40/44; A24F 40/70; A24F 40/40; H05B 6/36; H05B 6/108
See application file for complete search history.

(56) References Cited

U.S. PATENT DOCUMENTS 9,220,302 B2 12/2015 DePiano et al.
9,907,341 B1 3/2018 Zhu
(Continued)

FOREIGN PATENT DOCUMENTS

CN 202456410 U 10/2012
CN 106235419 A 12/2016
(Continued)

OTHER PUBLICATIONS

International Search Report dated Aug. 3, 2020, in International Application No. PCT/KR2020/005568.
(Continued)

*Primary Examiner* — Edwin A. Leon
(74) *Attorney, Agent, or Firm* — Sughrue Mion, PLLC

(57) ABSTRACT

There is provided an aerosol generating device including: an aerosol generating material delivery element configured to absorb an aerosol generating material stored in the cartridge; a heating element configured to heat the aerosol generating material; a support that includes a through-hole and accommodates the heating element and the aerosol generating material delivery element such that an end of the heating element passes through the through-hole and is exposed to an outside of the support; and a connector comprising a terminal providing power, and coupled to the support such that the end of the heating element contacts the terminal.

12 Claims, 10 Drawing Sheets

(51) Int. Cl.

| | |
|---|---|
| ***A24F 40/42*** | (2020.01) |
| ***A24F 40/44*** | (2020.01) |
| ***A24F 40/70*** | (2020.01) |
| ***H05B 6/10*** | (2006.01) |
| ***H05B 6/36*** | (2006.01) |

(52) U.S. Cl.
CPC ............... *A24F 40/70* (2020.01); *H05B 6/36* (2013.01); *H05B 6/108* (2013.01)

(56) References Cited

U.S. PATENT DOCUMENTS

| | | | | |
|---|---|---|---|---|
| 10,602,780 | B2 | 3/2020 | Chen | |
| 11,123,501 | B2 * | 9/2021 | Nettenstrom | A24F 40/40 |
| 2011/0036346 | A1 * | 2/2011 | Cohen | A24F 40/60 128/200.14 |
| 2014/0332020 | A1 | 11/2014 | Li et al. | |
| 2015/0282527 | A1 * | 10/2015 | Henry, Jr. | G01F 1/28 131/328 |
| 2016/0050975 | A1 * | 2/2016 | Worm | A24F 15/01 131/328 |
| 2017/0135403 | A1 | 5/2017 | Liu | |
| 2017/0224016 | A1 | 8/2017 | Reevell | |
| 2017/0295846 | A1 | 10/2017 | Liu | |
| 2018/0007966 | A1 | 1/2018 | Li et al. | |
| 2018/0317559 | A1 | 11/2018 | Qiu | |
| 2018/0343924 | A1 | 12/2018 | Lin et al. | |
| 2019/0046745 | A1 * | 2/2019 | Nettenstrom | A61M 15/002 |
| 2019/0098931 | A1 * | 4/2019 | Leadley | A61M 15/06 |
| 2019/0099561 | A1 | 4/2019 | Nettenstrom | |
| 2019/0116882 | A1 | 4/2019 | Ampolini et al. | |
| 2019/0387800 | A1 | 12/2019 | Lin et al. | |
| 2020/0367556 | A1 | 11/2020 | Lin et al. | |

FOREIGN PATENT DOCUMENTS

| | | | |
|---|---|---|---|
| CN | 106235420 | A | 12/2016 |
| CN | 106690425 | A | 5/2017 |
| CN | 206603236 | U | 11/2017 |
| CN | 108778384 | A | 11/2018 |
| JP | 2016-511008 | A | 4/2016 |
| KR | 10-1524997 | B1 | 6/2015 |
| KR | 10-2016-0048022 | A | 5/2016 |
| KR | 10-2018-0117654 | A | 10/2018 |
| WO | 2014/080410 | A1 | 5/2014 |
| WO | 2014/150979 | A2 | 9/2014 |
| WO | 2017/163045 | A1 | 9/2017 |
| WO | 2018/057957 | A1 | 3/2018 |
| WO | 2018/172765 | A1 | 9/2018 |
| WO | 2019/038521 | A1 | 2/2019 |

OTHER PUBLICATIONS

Chinese Office Action dated Feb. 10, 2023 in Chinese Application No. 202080001493.4.

Extended European Search Report dated Nov. 3, 2021 in European Application No. 20746537.8.

Notice of Reasons for Refusal dated Oct. 5, 2021 from the Japanese Patent Office in Japanese Application No. 2020-543904.

Communication dated Jan. 19, 2021 in corresponding Korean Application No. 2019-0050985.

Chinese Office Action dated Jul. 27, 2023 in Application No. 202080001493.4.

Notice of Reasons for Refusal dated Jan. 9, 2024 in Japanese Application No. 2022-133875.

* cited by examiner

【Figure 1】
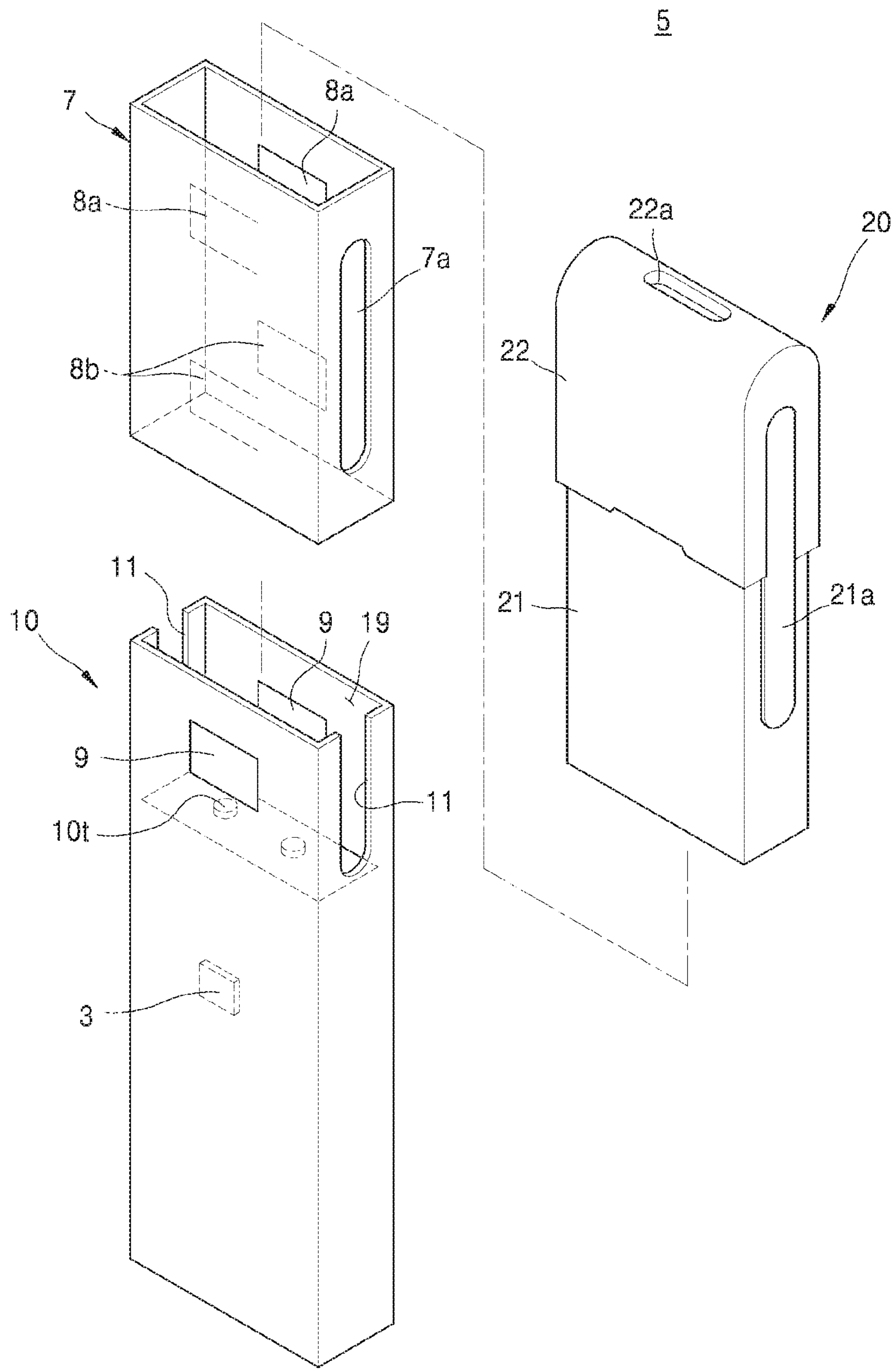

【Figure 2】
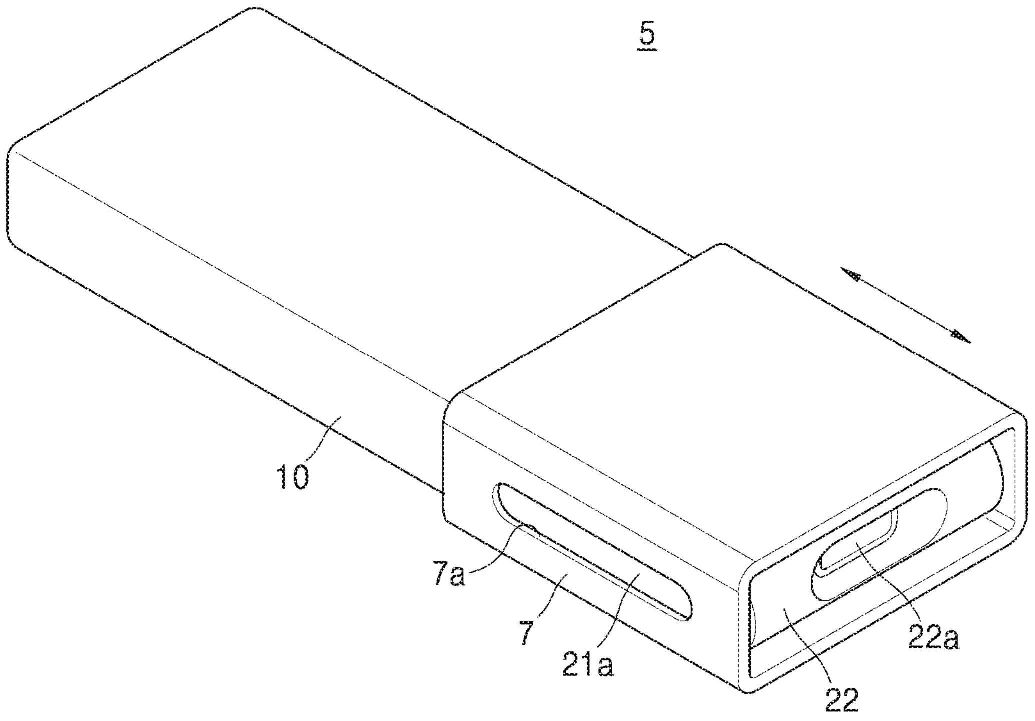

【Figure 3】
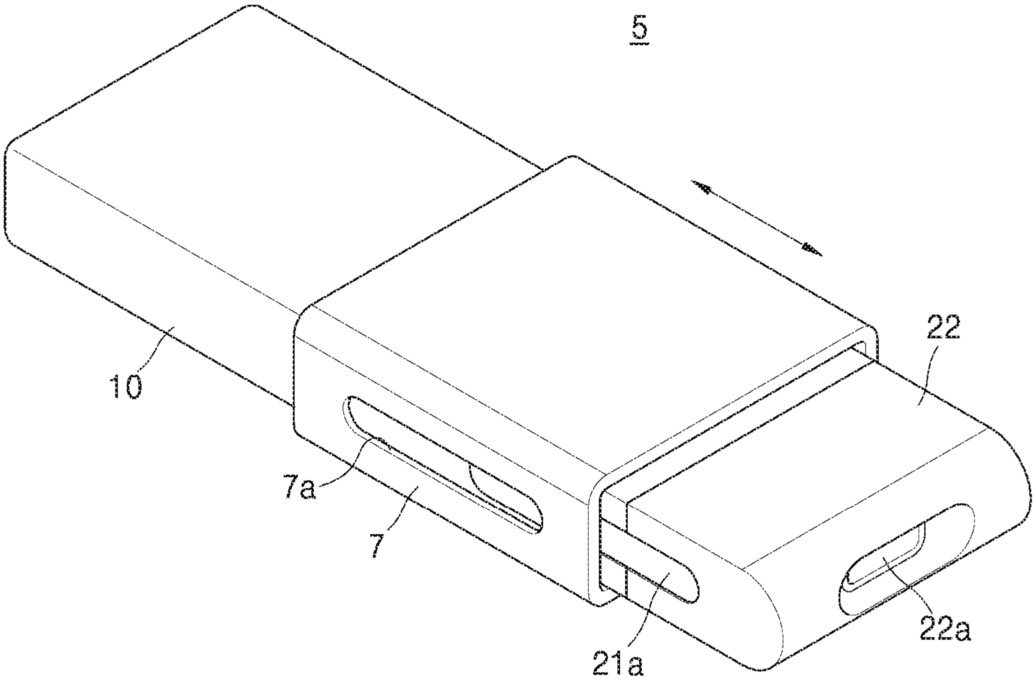

【Figure 4】
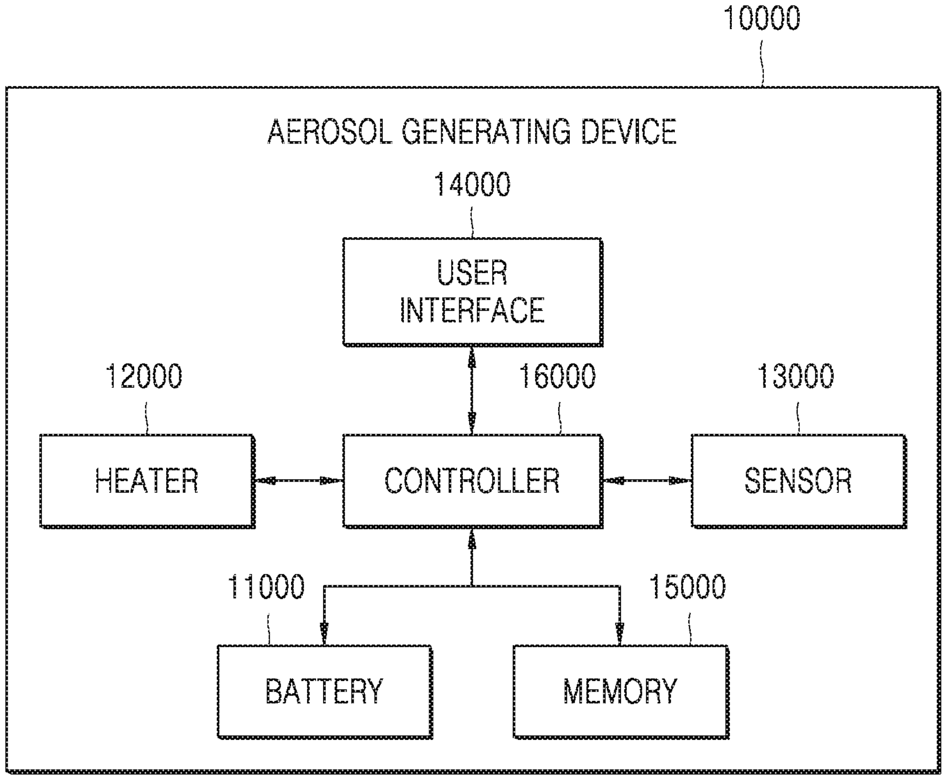

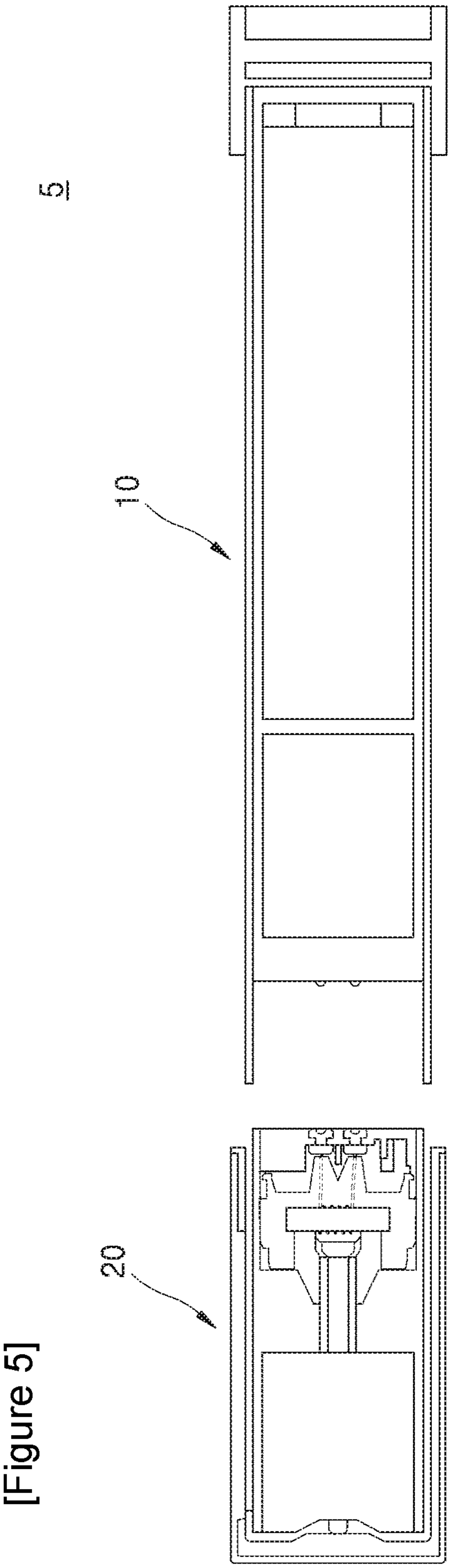
[Figure 5]

【Figure 6】
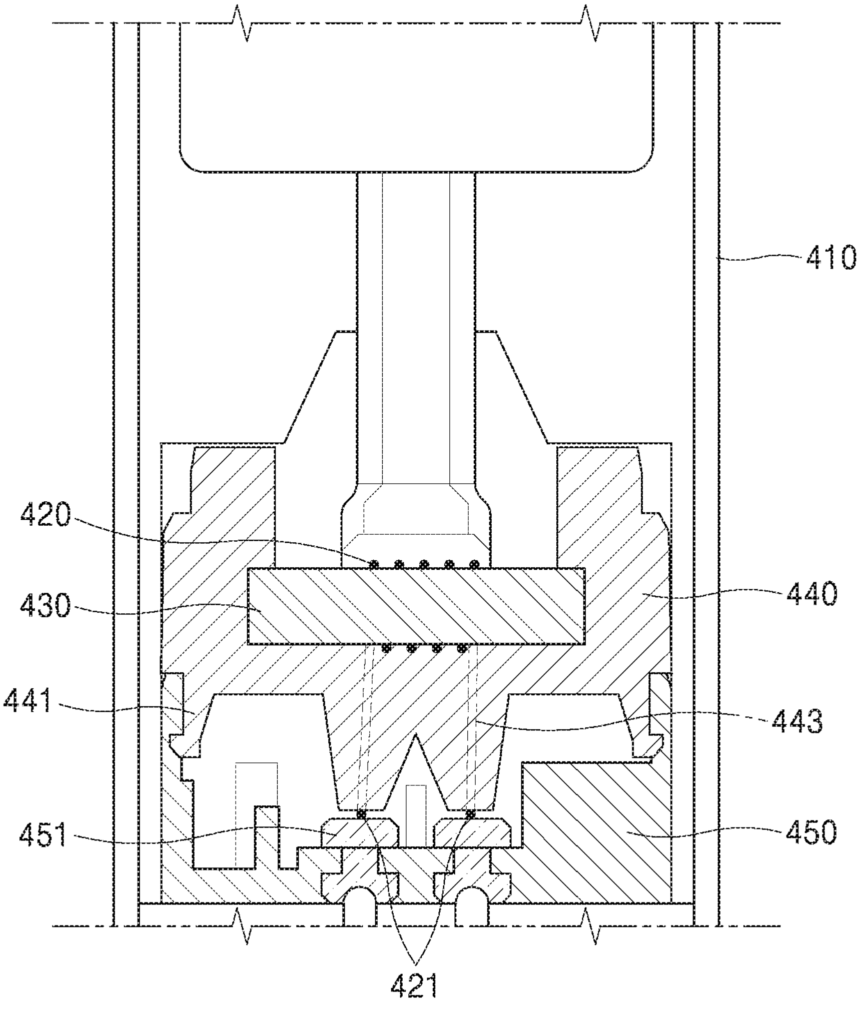

【Figure 7】
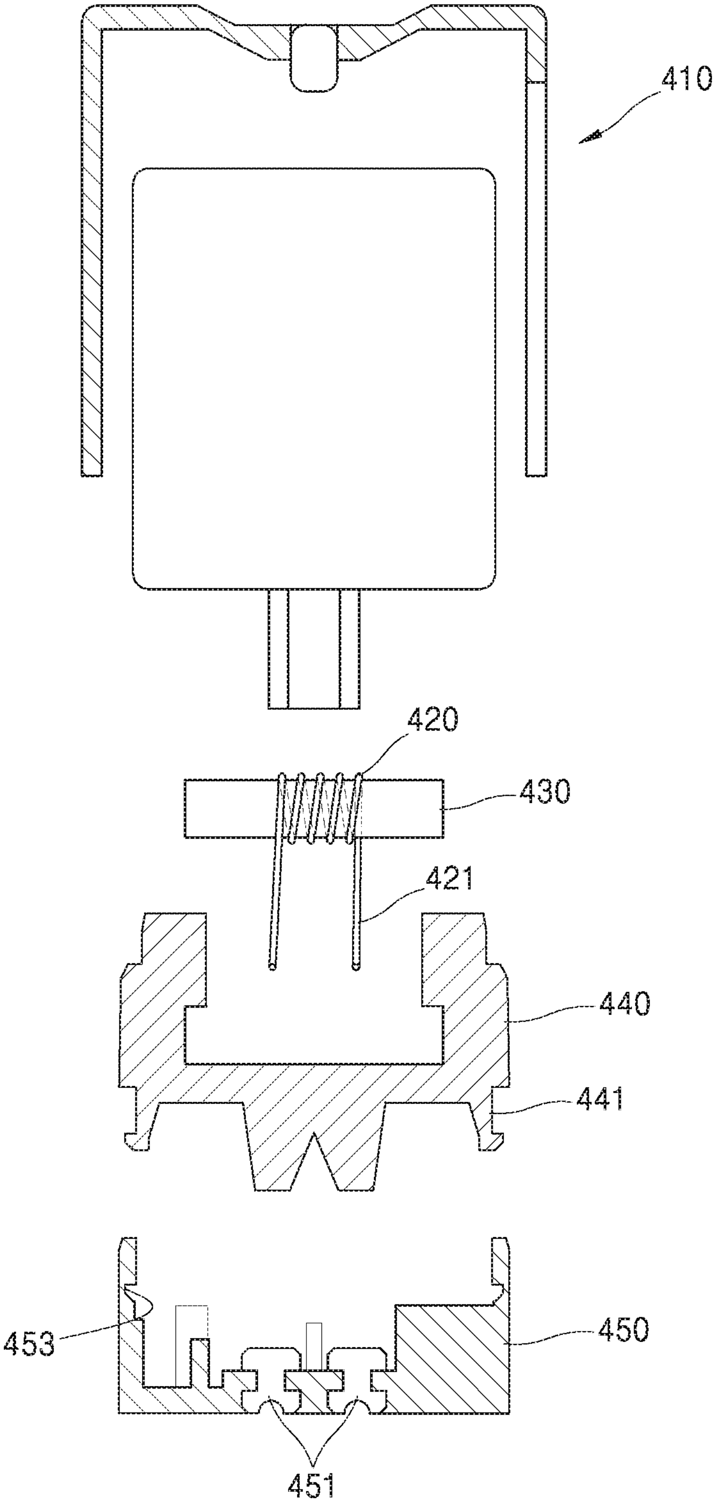

【Figure 8】
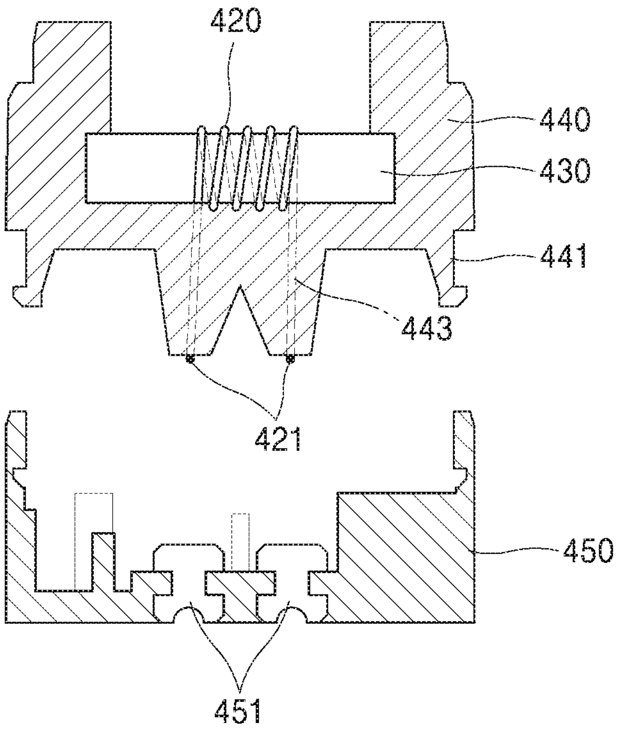

【Figure 9】
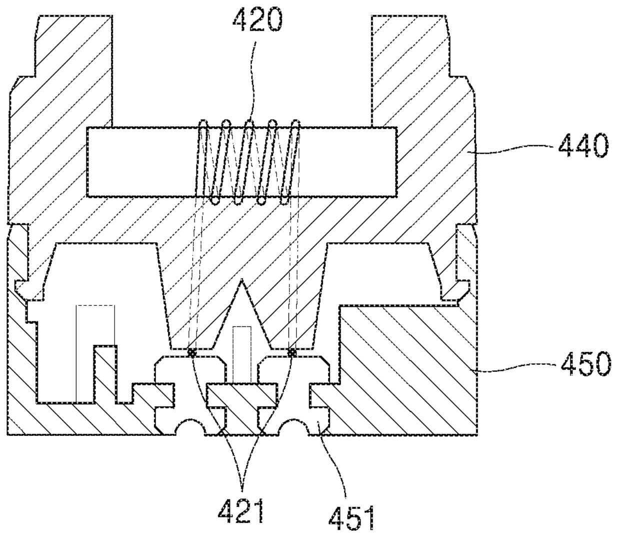

【Figure 10】
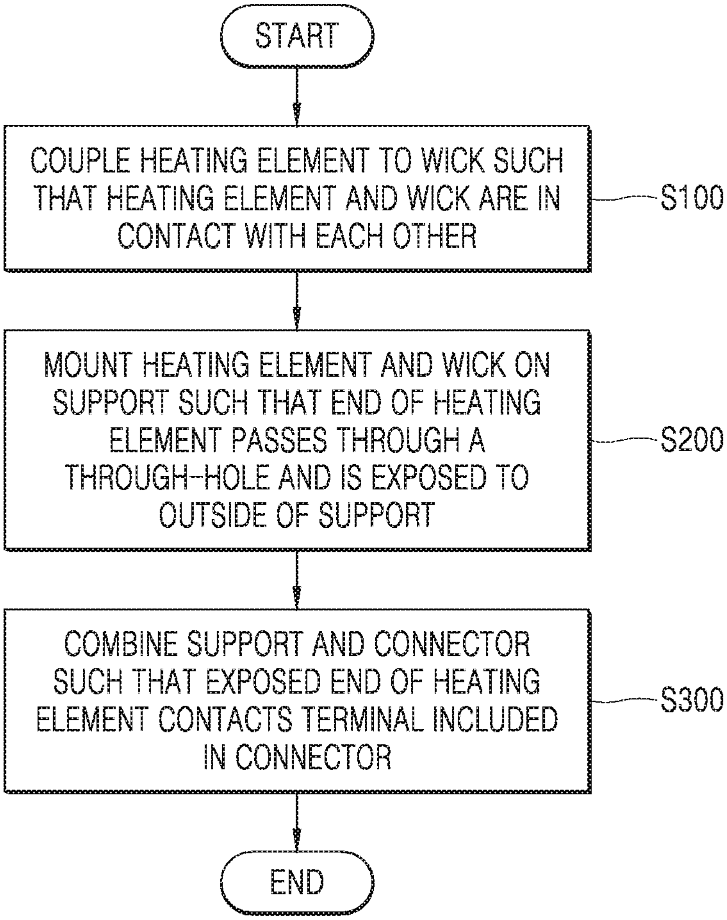

CARTRIDGE FOR AEROSOL GENERATING DEVICE AND METHOD FOR MANUFACTURING THE SAME

CROSS REFERENCE TO RELATED APPLICATIONS

This application is a National Stage of International Application No. PCT/KR2020/005568 filed Apr. 28, 2020, claiming priority based on Korean Patent Application No. 10-2019-0050985 filed Apr. 30, 2019.

TECHNICAL FIELD

The present disclosure relates to a method of connecting a heating element for heating an aerosol generating material to a battery in an aerosol generating device.

BACKGROUND ART

In recent years, demands for an alternative to traditional cigarettes have increased. For example, there is growing demand for aerosol generating device that generating aerosol by heating an aerosol generating material, rather than combusting a cigarette.

In order to heat and vaporize a liquid containing an aerosol generating material, a heating element has to receive electricity from a battery of a main body, and the heating element is generally connected to a terminal electrically connected to the battery by soldering.

However, the connection method using the soldering as described above has a disadvantage in terms of the manufacturing process and the product quality.

DISCLOSURE

Technical Solution

According to embodiments, a heating element and a terminal are connected by using a method of pressurizing configuration elements, not by using a soldering method through a dimension overlap design between elements of an aerosol generating device, and thus, electricity may be stably supplied to the heating element.

The technical problem is not limited to the above description, and other technical problems may be inferred from the following examples.

A cartridge for an aerosol generating device according to an embodiment includes an aerosol generating material delivery element configured to absorb an aerosol generating material stored in the cartridge; a heating element configured to heat the aerosol generating material; a support that includes a through-hole, and accommodates the heating element and the aerosol generating material delivery element such that an end of the heating element passes through the through-hole and is exposed to an outside of the support; and a connector comprising a terminal providing power, and coupled to the support such that the end of the heating element contacts the terminal.

Advantageous Effects

A cartridge for an aerosol generating device according to the embodiments may connect or couple a heating element and a terminal without soldering, and thus, coupling power between the heating element and the terminal increases through a dimension overlap design between the elements.

In addition, by using the connection method described above, a manufacturing process of the cartridge for aerosol generating device may be simplified, manufacturing time may be significantly reduced, and the quality of a product may be improved.

Effects of the present disclosure are not limited to the above description and may include other effects that may be inferred from the embodiments described below.

DESCRIPTION OF DRAWINGS

FIG. 1 is an exploded perspective view schematically illustrating a coupling relationship between a replaceable cartridge containing an aerosol-generating material and an aerosol generating device having the same, according to an embodiment;

FIG. 2 is a perspective view illustrating an example operation state of the aerosol generating device according to the embodiment illustrated in FIG. 1;

FIG. 3 is a perspective view illustrating another example operation state of the aerosol generating device according to the embodiment illustrated in FIG. 1;

FIG. 4 is a block diagram of an aerosol generating device according to an embodiment;

FIG. 5 is an exploded cross-sectional view of an aerosol generating device according to an embodiment, in which a main body and a cartridge are separated;

FIG. 6 is a cross-sectional view of a cartridge according to an embodiment;

FIG. 7 is an exploded cross-sectional view of a cartridge according to an embodiment;

FIG. 8 is a cross-sectional view of a supporter and a connector according to an embodiment;

FIG. 9 is a cross-sectional view illustrating a coupling state of a supporter and a connector according to an embodiment; and FIG. 10 is a flowchart illustrating a method of manufacturing a cartridge for an aerosol generating device, according to yet another embodiment.

BEST MODE

A cartridge for an aerosol generating device according to an embodiment includes an aerosol generating material delivery element configured to absorb an aerosol generating material stored in the cartridge; a heating element configured to heat the aerosol generating material; a support that includes a through-hole, and accommodates the heating element and the aerosol generating material delivery element such that an end of the heating element passes through the through-hole and is exposed to an outside of the support; and a connector comprising a terminal providing power, and coupled to the support such that the end of the heating element contacts the terminal.

In the embodiments, the heating element may include a heating wire.

In the embodiments, a central portion of the heating element may be coupled to the aerosol generating material delivery element.

In the embodiments, the end of the heating element may be pressurized by the support and the connector.

In the embodiments, the end of the heating element may have a bent portion disposed between the support and the connector.

In the embodiments, any one of the support and the connector may include a protrusion, and the other of the support and the connector may include a groove coupled to the protrusion.

In the embodiments, a protruding length of the protrusion may be 1.0 mm to 3.0 mm.

Another aspect of the present disclosure may provide an aerosol generating device including the above-described cartridge; a main body that supports the cartridge in a replaceable manner; and a battery that is disposed in the main body to supply electricity to the cartridge.

In the embodiments, the terminal of the connector may be electrically connected to the battery.

Another aspect of the present disclosure may provide a method of manufacturing a cartridge for an aerosol generating device, the method comprising: coupling a heating element to an aerosol generating material delivery element; mounting the heating element and the aerosol generating material on a support including a through-hole such that an end of the heating element passes through the through-hole and is exposed to an outside of the support; coupling the support to a connector comprising a terminal providing power such that the exposed end of the heating element contacts the terminal.

In the embodiments, the end of the heating element may be pressurized between the support and the connector to be in contact with the terminal.

MODE FOR INVENTION

With respect to the terms used to describe the various embodiments, general terms which are currently and widely used are selected in consideration of functions of structural elements in the various embodiments of the present disclosure. However, meanings of the terms can be changed according to intention, a judicial precedence, the appearance of new technology, and the like. In addition, in certain cases, a term which is not commonly used can be selected. In such a case, the meaning of the term will be described in detail at the corresponding portion in the description of the present disclosure. Therefore, the terms used in the various embodiments of the present disclosure should be defined based on the meanings of the terms and the descriptions provided herein.

In addition, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and/or operation and can be implemented by hardware components or software components and combinations thereof.

As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

It will be understood that when an element or layer is referred to as being "over," "above," "on," "connected to" or "coupled to" another element or layer, it can be directly over, above, on, connected or coupled to the other element or layer or intervening elements or layers may be present. In contrast, when an element is referred to as being "directly over," "directly above," "directly on," "directly connected to" or "directly coupled to" another element or layer, there are no intervening elements or layers present. Like numerals refer to like elements throughout.

Hereinafter, the present disclosure will now be described more fully with reference to the accompanying drawings, in which example embodiments of the present disclosure are shown such that one of ordinary skill in the art may easily work the present disclosure. The disclosure can, however, be embodied in many different forms and should not be construed as being limited to the embodiments set forth herein.

Hereinafter, embodiments of the present disclosure will be described in detail with reference to the drawings.

FIG. 1 is an exploded perspective view schematically illustrating a coupling relationship between a replaceable cartridge containing an aerosol generating material and an aerosol generating device including the same, according to an embodiment.

An aerosol generating device 5 according to the embodiment illustrated in FIG. 1 includes the cartridge 20 containing the aerosol generating material and a main body 10 supporting the cartridge 20.

The cartridge 20 containing the aerosol generating material may be coupled to the main body 10. A portion of the cartridge 20 may be inserted into an accommodation space 19 of the main body 10 so that the cartridge 20 may be mounted on the main body 10.

Aerosol Generating Material in the Cartridge (Liquid Composition)

The cartridge 20 may contain an aerosol generating material in at least one of, for example, a liquid state, a solid state, a gaseous state, or a gel state. The aerosol generating material may include a liquid composition. For example, the liquid composition may be a liquid including a tobacco-containing material having a volatile tobacco flavor component, or a liquid including a non-tobacco material.

For example, the liquid composition may include one component of water, solvents, ethanol, plant extracts, spices, flavorings, and vitamin mixtures, or a mixture of these components. The spices may include menthol, peppermint, spearmint oil, and various fruit-flavored ingredients, but are not limited thereto. The flavorings may include ingredients capable of providing various flavors or tastes to a user. Vitamin mixtures may be a mixture of at least one of vitamin A, vitamin B, vitamin C, and vitamin E, but are not limited thereto. In addition, the liquid composition may include an aerosol forming agent such as glycerin and propylene glycol.

For example, the liquid composition may include any weight ratio of glycerin and propylene glycol solution to which nicotine salts are added. The liquid composition may include two or more types of nicotine salts. Nicotine salts may be formed by adding suitable acids, including organic or inorganic acids, to nicotine. Nicotine may be a naturally generated nicotine or synthetic nicotine and may have any suitable weight concentration relative to the total solution weight of the liquid composition.

Acid for the formation of the nicotine salts may be appropriately selected in consideration of the rate of nicotine absorption in the blood, the operating temperature of the aerosol generating device 5, the flavor or savor, the solubility, or the like. For example, the acid for the formation of nicotine salts may be a single acid selected from the group consisting of benzoic acid, lactic acid, salicylic acid, lauric acid, sorbic acid, levulinic acid, pyruvic acid, formic acid, acetic acid, propionic acid, butyric acid, valeric acid, caproic acid, caprylic acid, capric acid, citric acid, myristic acid, palmitic acid, stearic acid, oleic acid, linoleic acid, linolenic acid, phenylacetic acid, tartaric acid, succinic acid, fumaric acid, gluconic acid, saccharic acid, malonic acid, and malic acid, or maybe a mixture of two or more acids selected from the above-described group, but is not limited thereto.

Cartridge Heating

The cartridge 20 may be operated by an electrical signal or a wireless signal transmitted from the main body 10 to perform a function of generating aerosol by converting the phase of the aerosol generating material inside the cartridge 20 to a gaseous phase. The aerosol may refer to a gas in which vaporized particles generated from an aerosol generating material are mixed with air.

For example, in response to receiving the electrical signal from the main body 10, the cartridge 20 may convert the phase of the aerosol generating material by heating the aerosol generating material, using, for example, an ultrasonic vibration method or an induction heating method. In an embodiment, the cartridge 20 may include its own power source and generate aerosol based on an electric control signal or a wireless signal received from the main body 10.

Cartridge 20: Storage with Atomizer (Aerosol Generating Material Delivery Element with Heater)

The cartridge 20 may include a storage 21 accommodating the aerosol generating material therein, and an atomizer performing a function of converting the aerosol generating material of the storage 21 to aerosol.

When the storage 21 "accommodates the aerosol generating material" therein, it means that the storage 21 functions as a container simply holding an aerosol generating material and that the storage 21 includes therein an element containing an aerosol generating material, such as a sponge, cotton, fabric, or porous ceramic structure.

The atomizer may include, for example, an aerosol generating material delivery element (e.g., a wick) for absorbing the aerosol generating material and maintaining the same in an optimal state for conversion to aerosol, and a heater heating the aerosol generating material delivery element to generate aerosol.

The aerosol generating material delivery element may include at least one of, for example, a cotton fiber, a ceramic fiber, a glass fiber, and porous ceramic.

The heater may include a metallic material such as copper, nickel, tungsten, or the like to heat the aerosol generating material delivered to the aerosol generating material delivery element by generating heat using electrical resistance. The heater may be implemented by, for example, a metal wire, a metal plate, a ceramic heating element, or the like. Also, the heater may be implemented by a conductive filament using a material such as a nichrome wire, and may be wound around or arranged adjacent to the aerosol generating material delivery element.

In addition, the atomizer 110 may be implemented by a heating element (i.e., a heater) in the form of a mesh or plate, which absorbs the aerosol generating material and maintains the same in an optimal state for conversion to aerosol, and generates aerosol by heating the aerosol generating material. In this case, a separate aerosol generating material delivery element may not be required.

Protruding Window **21*a***

At least a portion of the storage 21 of the cartridge 20 may include a transparent portion so that the aerosol generating material accommodated in the cartridge 20 may be visually identified from the outside. The storage 21 includes a protruding window **21*a* protruding from the storage 21, so that the storage 21 may be inserted into a groove 11 of the main body 10 when coupled to the main body 10. A mouthpiece 22 and/or the storage 21 may be entirely formed of transparent plastic or glass. Alternatively, only the protruding window 21*a*** may be formed of a transparent material.

Connection Terminal **10*t***

The main body 10 includes a connection terminal **10*t* arranged inside the accommodation space 19. When the storage 21 of the cartridge 20 is inserted into the accommodation space 19 of the main body 10, the main body 10 may provide power to the cartridge 20 or supply a signal related to an operation of the cartridge 20 to the cartridge 20, through the connection terminal 10*t***.

Mouthpiece 22, Discharge Hole **22*a***

The mouthpiece 22 is coupled to one end of the storage 21 of the cartridge 20. The mouthpiece 22 is a portion of the aerosol generating device 5, which is to be inserted into a user's mouth. The mouthpiece 22 includes a discharge hole **22*a* for discharging aerosol generated from the aerosol generating material inside the storage 21** to the outside.

Structure of a Slider 7

The slider 7 is coupled to the main body 10 in such a way that the slider 7 may move on the main body 10. The slider 7 covers or exposes at least a portion of the mouthpiece 22 of the cartridge 20 coupled to the main body 10 by moving with respect to the main body 10. The slider 7 includes an elongated hole **7*a* exposing at least a portion of the protruding window 21*a* of the cartridge 20** to the outside.

As shown FIG. 1, the slider 7 may have a shape of a hollow container with both ends opened, but the structure of the slider 7 is not limited thereto. For example, the slider 7 may have a bent plate structure having a clip-shaped cross-section, which is movable with respect to the main body 10 while being coupled to an edge of the main body 10. In another example, the slider 7 may have a curved semi-cylindrical shape with a curved arc-shaped cross section.

Function of the Slider 7: Magnetic Body, Position Change Detecting Sensor (Hall IC)

The slider 7 may include a magnetic body for maintaining the position of the slider 7 with respect to the main body 10 and the cartridge 20. The magnetic body may include a permanent magnet or a material such as iron, nickel, cobalt, or an alloy thereof.

The magnetic body may include two first magnetic bodies **8*a* facing each other, and two second magnetic bodies 8*b* facing each other. The first magnetic bodies 8*a* may be spaced apart from the second magnetic bodies 8*b* in a longitudinal direction of the main body 10 (i.e., the direction in which the main body 10 extends), which is a moving direction of the slider 7**.

The main body 10 includes a fixed magnetic body 9 arranged on a path along which the first magnetic bodies **8*a* and the second magnetic bodies 8*b* of the slider 7 move as the slider 7 moves with respect to the main body 10. Two fixed magnetic bodies 9 of the main body 10 may be mounted to face each other with the accommodation space 19** therebetween.

The slider 7, the slider 7 may be stably maintained in a position where an end of the mouthpiece 22 is covered or exposed by a magnetic force acting between the fixed magnetic body 9 and the first magnetic body **8*a* or between the fixed magnetic body 9 and the second magnetic body 8*b***.

The main body 10 includes a position change detecting sensor 3 arranged on the path along which the first magnetic body **8*a* and the second magnetic body 8*b* of the slider 7 move as the slider 7 moves with respect to the main body 10. The position change detecting sensor 3** may include, for example, a Hall integrated circuit (IC) that uses the Hall effect to detect a change in a magnetic field, and may generate a signal based on the detected change.

In the aerosol generating device 5 according to the above-described embodiments, horizontal cross sections of the main body 10, the cartridge 20, and the slider 7 have approximately rectangular shapes (i.e., when viewed in the longitudinal direction), but in the embodiments, the shape of the aerosol generating device 5 is not limited. The aerosol generating device 5 may have, for example, a cross-sectional shape of a circle, an ellipse, a square, or various polygonal shapes. In addition, the aerosol generating device 5 is not necessarily limited to a structure that extends linearly, and may be curved in a streamlined shape or bent at a preset angle in a specific area to be easily held by the user.

FIGS. 2 and 3: Examples of Movement of a Slider, a Remaining Amount Checking Window FIG. 2 is a perspective view of an example operating state of the aerosol generating device according to the embodiment illustrated in FIG. 1.

In FIG. 2, the slider 7 is moved to a position where the end of the mouthpiece 22 of the cartridge coupled to the main body 10 is covered. In this state, the mouthpiece 22 may be safely protected from external impurities and kept clean.

The user may check the remaining amount of aerosol generating material contained in the cartridge by visually checking the protruding window 21*a* of the cartridge through the elongated hole 7*a* of the slider 7. The user may move the slider 7 in the longitudinal direction of the main body 10 to use the aerosol generating device 5.

FIG. 3 is a perspective view of another example operating state of the aerosol generating device according to the embodiment illustrated in FIG. 1.

In FIG. 3, the operating state is shown in which the slider 7 is moved to a position where the end of the mouthpiece 22 of the cartridge coupled to the main body 10 is exposed to the outside. In this state, the user may insert the mouthpiece 22 into his or her mouth and inhale aerosol discharged through the discharge hole 22*a* of the mouthpiece 22.

As shown in FIG. 3, the protruding window 21*a* of the cartridge is still exposed to the outside through the elongated hole 7*a* of the slider 7 when the slider 7 is moved to the position where the end of the mouthpiece 22 is exposed to the outside. Thus, the user may visually check the remaining amount of aerosol generating material contained in the cartridge, regardless of the position of the slider 7.

FIG. 4 is a block diagram of the aerosol generating device according to an embodiment.

Referring to FIG. 4, the aerosol generating device 10000 may include a battery 11000, a heater 12000, a sensor 13000, a user interface 14000, a memory 15000, and a controller 16000. However, the internal structure of the aerosol generating device 10000 is not limited to the structures illustrated in FIG. 4. Also, it will be understood by one of ordinary skill in the art that some of the hardware components shown in FIG. 4 may be omitted or new components may be added according to the design of the aerosol generating device 5.

In an embodiment where the aerosol generating device 10000 includes a main body without a cartridge, the components of the aerosol generating device 10000 may be located in the main body. In another embodiment where the aerosol generating device 10000 includes a main body and a cartridge, the components of the aerosol generating device 10000 may be located in the main body and/or the cartridge.

Hereinafter, an operation of each of the components will be described without being limited to location of the components.

Battery 11000

The battery 11000 supplies electric power to be used for the aerosol generating device 10000 to operate. For example, the battery 11000 may supply power such that the heater 12000 may be heated. In addition, the battery 11000 may supply power required for operation of other components of the aerosol generating device 10000, such as the sensor 13000, the user interface 14000, the memory 15000, the controller 16000, etc. The battery 11000 may be a rechargeable battery or a disposable battery. For example, the battery 11000 may be a lithium polymer (LiPoly) battery, but is not limited thereto.

Heater 12000

The heater 12000 receives power from the battery 11000 under the control of the controller 16000. The heater 12000 may receive power from the battery 11000 and heat a cigarette inserted into the aerosol generating device 10000, or heat the cartridge mounted on the aerosol generating device 10000.

The heater 12000 may be located in the main body of the aerosol generating device 10000. Alternatively, the heater 12000 may be located in the cartridge. When the heater 12000 is located in the cartridge, the heater 12000 may receive power from the battery 11000 located in the main body and/or the cartridge.

The heater 12000 may be formed of any suitable electrically resistive material. For example, the suitable electrically resistive material may be a metal or a metal alloy including titanium, zirconium, tantalum, platinum, nickel, cobalt, chromium, hafnium, niobium, molybdenum, tungsten, tin, gallium, manganese, iron, copper, stainless steel, or nichrome, but is not limited thereto. In addition, the heater 12000 may be implemented by a metal wire, a metal plate on which an electrically conductive track is arranged, or a ceramic heating element, but is not limited thereto.

In an embodiment, the heater 12000 may be included in the cartridge. The cartridge may include the heater 12000, the aerosol generating material delivery element, and the storage. The aerosol generating material accommodated in the storage may be absorbed by the aerosol generating material delivery element, and the heater 12000 may heat the aerosol generating material absorbed by the aerosol generating material delivery element, thereby generating aerosol. For example, the heater 12000 may include a material such as nickel chromium and may be wound around or arranged adjacent to the aerosol generating material delivery element.

In another embodiment, the heater 12000 may heat the cigarette inserted into the accommodation space of the aerosol generating device 10000. As the cigarette is accommodated in the accommodation space of the aerosol generating device 10000, the heater 12000 may be located inside and/or outside the cigarette. Accordingly, the heater 12000 may generate aerosol by heating the aerosol generating material in the cigarette.

Meanwhile, the heater 12000 may include an induction heater. The heater 13000 may include an electrically conductive coil for heating a cigarette or the cartridge by an induction heating method, and the cigarette or the cartridge may include a susceptor which may be heated by the induction heater.

Sensor 13000

The aerosol generating device 10000 may include at least one sensor 13000. A result sensed by the at least one sensor 13000 is transmitted to the controller 16000, and the controller 16000 may control the aerosol generating device 10000 by controlling the operation of the heater, restricting smoking, determining whether a cigarette (or a cartridge) is inserted, displaying a notification, etc.

For example, the at least one sensor 13000 may include a puff detecting sensor. The puff detecting sensor may detect a user's puff based on any one of a temperature change, a flow change, a voltage change, and a pressure change.

In addition, the at least one sensor 13000 may include a temperature sensor. The temperature sensor may detect a temperature of the heater 12000 (or an aerosol generating material). The aerosol generating device 10000 may include a separate temperature sensor for sensing a temperature of the heater 12000, or the heater 12000 itself may serve as a temperature sensor instead of including a separate temperature sensor. Alternatively, a separate temperature sensor may be further included in the aerosol generating device 10000 while the heater 12000 serves as a temperature sensor.

In addition, the at least one sensor 13000 may include a position change detecting sensor. The position change detecting sensor may detect a change in a position of the slider coupled to the main body to move with respect to the main body.

User Interface 14000

The user interface 14000 may provide the user with information about the state of the aerosol generating device 10000. For example, the user interface 14000 may include various interfacing devices, such as a display or a lamp for outputting visual information, a motor for outputting haptic information, a speaker for outputting sound information, input/output (I/O) interfacing devices (for example, a button or a touch screen) for receiving information input from the user or outputting information to the user, terminals for performing data communication or receiving charging power, and/or communication interfacing modules for performing wireless communication (for example, Wi-Fi, Wi-Fi direct, Bluetooth, near-field communication (NFC), etc.) with external devices.

Memory 15000

The memory 15000 may store various data processed or to be processed by the controller 16000. The memory 15000 may include various types of memories, such as dynamic random access memory (DRAM), static random access memory (SRAM) read-only memory (ROM), electrically erasable programmable read-only memory (EEPROM), etc.

The memory 15000 may store an operation time of the aerosol generating device 10000, the maximum number of puffs, the current number of puffs, at least one temperature profile, data on a user's smoking pattern, etc.

Controller 16000

The controller 16000 may control overall operations of the aerosol generating device 10000. The controller 16000 may include at least one processor. A processor can be implemented as an array of a plurality of logic gates or can be implemented as a combination of a general-purpose microprocessor and a memory in which a program executable in the microprocessor is stored. It will be understood by one of ordinary skill in the art that the processor can be implemented in other forms of hardware.

The controller 16000 analyzes a result of the sensing by at least one sensor 13000, and controls processes that are to be performed subsequently.

The controller 16000 may control power supplied to the heater 12000 so that the operation of the heater 12000 is started or terminated, based on the result of the sensing by the at least one sensor 13000. In addition, based on the result of the sensing by the at least one sensor 13000, the controller 16000 may control the amount of power supplied to the heater 12000 and the time at which the power is supplied, so that the heater 12000 is heated to a predetermined temperature or maintained at an appropriate temperature.

In an embodiment, the controller 16000 may set a mode of the heater 12000 to a pre-heating mode to start the operation of the heater 12000 after receiving a user input to the aerosol generating device 10000. In addition, the controller 16000 may switch the mode of the heater 12000 from the pre-heating mode to an operation mode after detecting a user's puff by using the puff detecting sensor. In addition, the controller 16000 may stop supplying power to the heater 12000 when the number of puffs reaches a preset number after counting the number of puffs by using the puff detecting sensor.

The controller 16000 may control the user interface 14000 based on the result of the sensing by the at least one sensor 13000. For example, when the number of puffs counted by the puff detecting sensor reaches a preset number, the controller 16000 may notify the user by using the user interface 14000 (e.g., a lamp, a motor, a speaker, etc.) that the aerosol generating device 10000 will soon be terminated.

Cradle (not Shown)

Although not illustrated in FIG. 4, the aerosol generating device 10000 may be combined with a separate cradle to form an aerosol generating system. For example, the cradle may be used to charge the battery 11000 of the aerosol generating device 10000. For example, the aerosol generating device 10000 may be supplied with power from a battery of the cradle to charge the battery 11000 of the aerosol generating device 10000 while being accommodated in an accommodation space of the cradle.

FIG. 5 is a schematic diagram of an aerosol generating device according to an embodiment.

The aerosol generating device 5 according to the embodiment may include a cartridge 20 and a main body 10. The cartridge 20 may include a case, a heating element, an aerosol generating material delivery element, a support, and a connector. The main body 10 may include a battery.

The cartridge 20 and the main body 10 may be detachable from each other or may be manufactured to have an integrally coupled form.

In a case where the cartridge 20 and the main body 10 are separated from each other, when the aerosol generating material is exhausted, the cartridge 20 may be replaced.

FIG. 6 is a cross-sectional view illustrating elements of a cartridge according to the embodiment illustrated in FIG. 5.

A case 410 of the cartridge 20 may include a storage for storing an aerosol generating source (i.e. an aerosol generating material). For example, the storage may have a rectangular parallelepiped structure, and may further include a straight tube to transfer the aerosol generating material existing therein to a lower end of the cartridge. The cartridge 20 may include a heating element 420, an aerosol generating material delivery element 430, a support 400; and a connector 450, in addition to the storage.

Here, the aerosol generating material delivery element 430 may include, for example, a wick.

The heating element 420 may be disposed inside the case 410 and may heat the aerosol generating material. The aerosol generating material transported from the storage to the heating element 420 through the straight tube may be heated by the heating element 420. For example, the heating element 420 may heat the wick 430 wetted by a liquid containing the aerosol generating material.

The central portion of the heating element 420 may be coupled to the wick 430, and an end 421 of the heating element 420 may extend to the terminal 451 through a path 443 formed in the support 440. The path 443 may include at least one through-hole formed in the support 440. The end 421 of the heating element may be exposed to the outside of the support 440, and the exposed portion may contact the terminal 451 so that power is delivered to the heating element 420. The end 421 of the heating element 420 may include a bent portion disposed between the support 440 and the connector 450. When the support 440 and the connector 450 are coupled to each other, the bent portion of the end 421 of the heating element 420 may be pressurized by the support 440 and the connector 450. According to this structure, as the end 421 of the heating element 420 comes into contact with the terminal 451 to be electrically connected, the heating element 420 may receive power from the battery included in the main body 10.

The support 440 may have a structure that provides the path 443 through which the end 421 of the heating element 420 passes to contact the terminal 451. For example, when the heating element 420 is a heating wire (i.e., a wire that generates heat by electrical resistance), an end of the support may be formed in a shape of "W" letter including two paths 443, as shown in FIG. 6, so that both ends of the heating wire are connected to the terminals 451 to receive power, but the structure of the supporter 440 is not limited thereto.

When the support 440 including the heating element 420 is coupled to the connector 450, the end 421 of the heating element 420 is exposed at an end of the support 440, and the end 421 of heating element 420 may be in contact with the terminal 451 of the connector 450. As such, the heating element 420 may receive external electric power through the terminal 451.

Specifically, the ends 421 of the heating element 420 may be firmly disposed when assembling a finished product of the aerosol generating device 5 according to a precise dimension design of the support 440 and the connector 450. Here, the "precise dimension design" means a design method that allows minimal tolerance so that the support 440 and the connector 450 may be tightly coupled to each other.

The wick 430 may be disposed inside the case 410 and absorb the aerosol generating material. The wick 430 may be disposed at one end of a straight tube for transporting an aerosol generating material from the storage. In this case, the liquid containing an aerosol generating material may be transported from the storage to the wick 430, and the aerosol generating material may be effectively heated by the heating element 420 coupled to the wick 430. However, the present disclosure is not limited thereto.

The heating element 420 may be coupled to the wick 430. For example, the heating element 420 may have the form of a heating wire, a ring, a sheet, a mesh, etc., but is not limited thereto. Preferably, the heating element 420 may be a heating wire, and the heating wire may have a spiral shape surrounding the wick 430.

The support 440 may serve to support the heating element 420 and the wick 430. The support 440 may be disposed inside the case 410 of the cartridge 20, and may be disposed at one end of a straight tube connected to a storage. The support 440 has a cavity so that the heating element. 420 and the wick 430 may be disposed therein.

The support 440 may include the path 443 through which the heating element. 420 is connected to the terminal 451. The path 443 is not limited to a specific shape. For example, when a heating wire is used as the heating element 420, an end of the heating wire coupled to the wick 430 passes through the path 443 of the support 440 to receive power from the outside, but the present disclosure is not limited thereto.

The support 440 may include the protrusion 441. The Shape or number of the protrusion 441 are not limited. For example, as illustrated in FIG. 7, the support 440 may include two protrusions 441 disposed at two edge portions of a lower portion. The connector 450 may include grooves 453 coupled to the protrusions 441.

A protruding length L of the protrusion 441 may be, for example, approximately 1.0 mm to about 3.0 mm. The protruding length of the protrusion 441 may be changed within this range for coupling to the groove 453 formed in the connector 450. For example, an end of the protrusion 441 may be formed in a shape of "L" letter to strengthen coupling power to the groove 453.

As the protrusion 441 and the groove 453 are coupled to each other, the support 440 and the connector 450 may be strongly coupled to each other, and accordingly, the end 421 of the heating element 420 passing through the support 440 may be firmly coupled to the terminal 451 as compared to a case where the protrusion 441 and the groove 453 are not provided. As such it is possible to prevent the end 421 of the heating element and the terminal 451 from being separated from each other, but the present disclosure is not limited to the above-described coupling structure.

The connector 450 may include the terminal 451 coming into contact with the end 421 of the heating element as described above. The connector 450 may serve to receive power from a battery disposed in the outside or in the main body 20 of the aerosol generating device 5 and transmit the power to the heating element 420 through the end 421 of the heating element, but the present disclosure is not limited thereto.

The connector 450 may include the groove 451 coupled to the protrusion 441 as described above.

In another embodiment, the connector 450 may include a protrusion 441, and the supporter 440 may include a groove coupled with the protrusion 441 formed on the connector 450.

FIG. 7 illustrates an exploded view of the cartridge 20 for the aerosol generating device according to the embodiment.

Inside the case 410, the wick 430 coupled to the heating element 420, the support 440, and the connector 450 may be coupled together.

The heating element 420 may be inserted into the wick 430. Alternatively, the heating element 420 may surround the wick 430 in a spiral shape in the form of a wire. As such, heat generated in the wire may be effectively transmitted to the wick 430 and the liquid absorbed by the wick.

The end 421 of the heating element may be disposed to be separated from the wick 430 and may extend toward the support 440. The end 421 of the heating element may receive power from the terminal 451 formed in the connector 450.

The support 440 may support the heating element 420 and the wick 430. Specifically, the support 440 may include a cavity therein to accommodate the heating element 420 and the wick 430.

The support 440 may include one or more protrusions 441 for increasing coupling power to the connector 450.

The connector 450 may be coupled to the support 440. Specifically, the groove 453 of the connector 450 may be coupled to the protrusion 441 of the support 440 to increase coupling power.

The connector 450 may receive power from the outside or a battery of the main body 20 of the aerosol generating device 5, and transfer the power to the heating element 420. The connector 450 may include one or more terminals 451. For example, one side of the terminal 451 may be in contact with the end 420 of the heating element and the other side thereof may be in contact with a wire connected to the battery of the main body 20.

FIG. 8 is a schematic view illustrating the support 440 and the connector 450 separated from each other, according to an embodiment.

The heating element 420 and the wick 430 are disposed in a cavity of the support 440 in a coupled state. The heating element 420 surrounds the wick 430 in a spiral shape, and the end 421 of the heating element 420 passes through the path 443 of the support 440 to be exposed to the outside of the support 440.

FIG. 9 is a schematic view illustrating the support 440 and the connector 450 coupled to each other, according to an embodiment.

The end 421 of the heating element 420 exposed to the outside of the support 440 comes into contact with the terminal 451 of the connector 450. Since the support 440 and the connector 450 are tightly coupled, contact therebetween may be firmly maintained.

Moreover, the protrusion 441 of the support 440 is precisely coupled to the groove 453 of the connector 450, and thus, the coupling power between the support 440 and the connector 450 and/or the coupling power between the end 421 of the heating element and the terminal 451 may be increased. Accordingly, the cartridge 20 for an aerosol generating device 5 may stably heat an aerosol generating material by using power supplied from the outside, and durability thereof may be increased.

FIG. 10 is a flowchart illustrating a method of manufacturing a cartridge for an aerosol generating device, according to an embodiment.

In operation S100, the heating element 420 is coupled to the wick 430 such that the heating element 420 and the wick 430 are in contact with each other.

In operation S200, the heating element 420 and the wick 430 are mounted on the support 440 such that the end 421 of the heating element 420 passes through the path 443 and is exposed to the outside of the support 440. The exposed end of the heating element 420 may be bent.

In operation S300, the support 400 and the connector 450 are combined such that the end 421 of the heating element 420 contacts the terminal 451 included in the connector 450. As described above, the end 421 of the heating element 420 may be pressurized by the support 400 and the connector 450.

Technical characteristics of different aspects of the present disclosure described above may selectively be applied to the embodiments, and application thereof is not excluded even if the description is omitted.

At least one of the components, elements, modules or units (collectively "components" in this paragraph) represented by a block in the drawings such as the controller 16000, the user interface 14000, and the sensor 13000 in FIG. 4, may be embodied as various numbers of hardware, software and/or firmware structures that execute respective functions described above, according to an example embodiment. For example, at least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. Further, although a bus is not illustrated in the above block diagrams, communication between the components may be performed through the bus. Functional aspects of the above example embodiments may be implemented in algorithms that execute on one or more processors. Furthermore, the components represented by a block or processing steps may employ any number of related art techniques for electronics configuration, signal processing and/or control, data processing and the like.

The descriptions of the above-described embodiments are merely examples, and it will be understood by one of ordinary skill in the art that various changes and equivalents thereof may be made. Therefore, the scope of the disclosure should be defined by the appended claims, and all differences within the scope equivalent to those described in the claims will be construed as being included in the scope of protection defined by the claims.

What is claimed is:

1. A cartridge for an aerosol generating device comprising:
- an aerosol generating material delivery element configured to absorb an aerosol generating material stored in the cartridge;
- a heating element configured to heat the aerosol generating material;
- a support that accommodates the heating element and the aerosol generating material delivery element; and
- a connector comprising a terminal providing power, and coupled to the support such that the end of the heating element contacts the terminal,
- wherein the support further includes a protruding structure protruding toward the connector and providing a through-hole through which an end of the heating element passes, and
- the end of the heating element is exposed to an outside at an end of the support and electrically connected to the terminal by being pressurized by the support and the connector.

2. The cartridge for the aerosol generating device of claim 1, wherein the heating element is a heating wire.

3. The cartridge for the aerosol generating device of claim 1, wherein a central portion of the heating element is coupled to the aerosol generating material delivery element.

4. The cartridge for the aerosol generating device of claim 1, wherein the end of the support is formed in a shape of "W" letter including two through-holes.

5. The cartridge for the aerosol generating device of claim 1, wherein the end of the heating element has a bent portion disposed between the support and the connector.

6. The cartridge for the aerosol generating device of claim 1, wherein one of the support and the connector includes a protrusion, and the other of the support and the connector includes a groove coupled to the protrusion.

7. The cartridge for the aerosol generating device of claim 6, wherein a protruding length of the protrusion is 1.0 mm to 3.0 mm.

8. An aerosol generating device comprising:
- the cartridge according to claim 1;

a main body coupled to the cartridge in a replaceable manner; and a battery that is disposed in the main body to supply power to the cartridge.

9. The aerosol generating device of claim 8, wherein the terminal of the connector is electrically connected to the battery.

10. A method of manufacturing a cartridge for an aerosol generating device, the method comprising:

coupling a heating element to an aerosol generating material delivery element;

mounting the heating element and the aerosol generating material on a support including a protruding structure protruding toward a connector and providing a through-hole through which an end of the heating element passes and is exposed to an outside; and coupling the support to the connector comprising a terminal providing power such that the exposed end of the heating element contacts the terminal, wherein the coupling of the support to the connector comprises pressurizing the end of the heating element by the support and the connector such that the end of the heating element is electrically connected to the terminal.

11. The method of manufacturing a cartridge for an aerosol generating device of claim 10, wherein the mounting comprises bending the exposed end of the heating element.

12. The cartridge for the aerosol generating device of claim 1, wherein the aerosol generating material is in a liquid state.

* * * * *